US005598773A

United States Patent [19]
Hoffseth

[11] Patent Number: 5,598,773
[45] Date of Patent: Feb. 4, 1997

[54] MELON RIND TRIMMING DEVICE

[76] Inventor: John J. Hoffseth, P.O. Box 2106, Freedom, Calif. 95019-2106

[21] Appl. No.: 501,904

[22] Filed: Jul. 13, 1995

Related U.S. Application Data

[63] Continuation-in-part of Ser. No. 153,216, Nov. 15, 1993, abandoned.

[51] Int. Cl.$^6$ .............................. A23N 7/00; A47J 17/00
[52] U.S. Cl. ........................................ 99/585; 99/589
[58] Field of Search ............................ 99/589, 595, 584, 99/585, 587, 588; 452/127; 209/43; 83/109, 112, 115, 149

[56] References Cited

U.S. PATENT DOCUMENTS

| | | | |
|---|---|---|---|
| 1,615,304 | 1/1927 | Korner et al. | 99/585 |
| 2,578,952 | 12/1951 | Townsend et al. | 99/589 X |
| 2,912,027 | 11/1959 | Townsend et al. | 99/589 X |
| 3,215,179 | 11/1965 | Schill | 99/589 X |
| 4,250,594 | 2/1987 | Mitchell | 99/589 X |
| 4,606,093 | 8/1986 | Townsend | 99/589 X |
| 4,730,368 | 3/1988 | Townsend et al. | 99/589 X |

*Primary Examiner*—David Scherbel
*Assistant Examiner*—Reginald L. Alexander
*Attorney, Agent, or Firm*—Plante & Strauss

[57] ABSTRACT

There is disclosed a device for removal of rind from melons which has a cutting station with a flat, planar, cutting member having an upwardly facing cutting edge mounted on a flat planar pressure shoe, a rotary feeder having a body with an external surface of revolution with a plurality of teeth distributed about its external surface and rotationally mounted at the cutting station adjacent to and spaced apart from the cutting member by a distance sufficient to permit passage of separated rind; a drive to rotate the feeder; and a feed chute to introduce sectors of fruit to the cutting station for engagement with the rotary feeder.

19 Claims, 4 Drawing Sheets

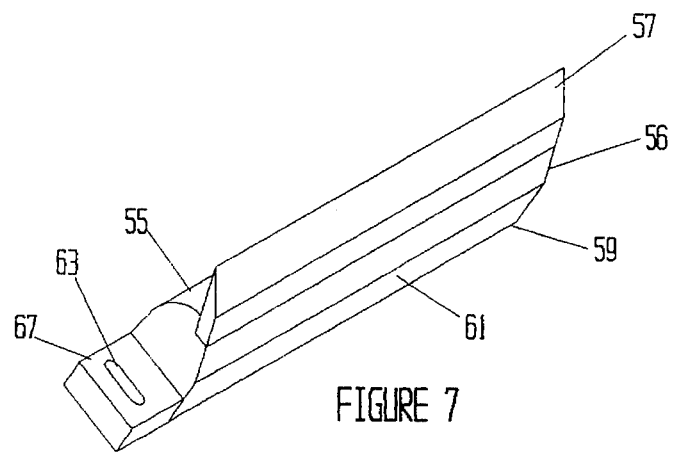
FIGURE 7
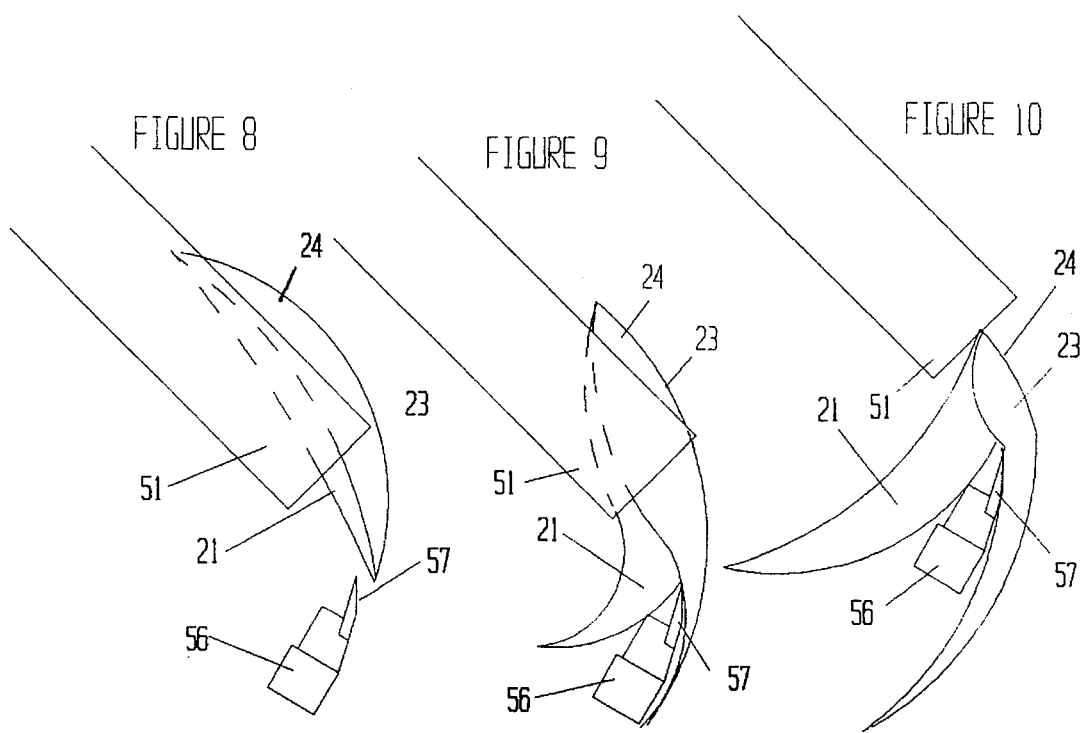
FIGURE 8
FIGURE 9
FIGURE 10

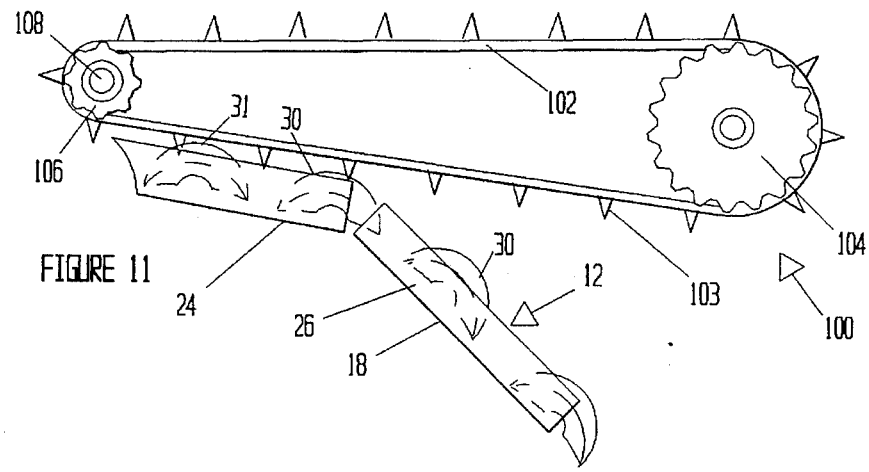
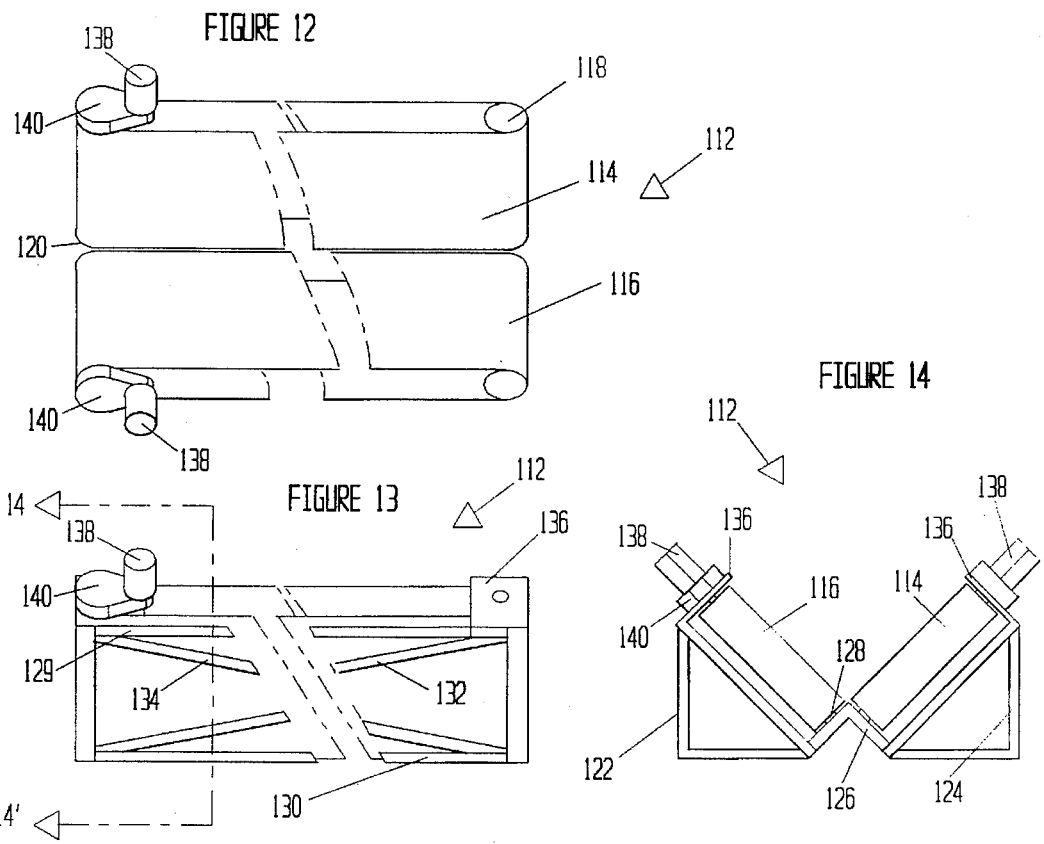

MELON RIND TRIMMING DEVICE

REFERENCE TO RELATED APPLICATIONS

This application is a continuation in part of my application, Ser. No. 08/153,216, filed on Nov. 15, 1993, now abandoned.

BACKGROUND OF THE INVENTION

1. Field of Invention

This invention relates to a device for removing the outer rind from melon sectors.

2. Brief Statement of the Prior Art

Melons, such as cantaloupes, Persian melons, watermelons, etc., which are processed by sectoring and removing of rind have found an increasing acceptance in the market. The processed melons provide growers with a reasonable alternative for upgrading the market value of their produce and provide the end user, e.g., frozen food processors, commercial restaurants, food chains and the like, with fruit requiring little or no preparation prior to serving.

Unfortunately, there is no efficient, automated device which is specifically designed to remove rind from sectors of melons. In the conventional preparation, melons are washed, sectored into halves, quarters, sixths, eighths, etc., having moon-shapes. The seeds are removed, and the melon sectors are washed by floating in a water bath. The washed sectors are removed from the water bath and manually trimmed to remove rind.

Mechanical trimming devices have not been used to remove rind from melons because no device has been designed which avoids damage to the melon or excess loss of valuable melon to waste. The market demand, which has only recently developed for trimmed, fresh melon, has been met by manual trimming of melons.

An example of a manual device which has been proposed for removing rind from melon sectors is shown in U.S. Pat. No. 4,571,832. That device is similar to a wire cheese cutter in that it has a roller which rides on the inside of the melon sector and guides a cutting member beneath the rind, along the exterior surface of the sector. This device does not have the flexibility to trim melons of varied sizes.

U.S. Pat. No. 1,615,304 discloses a fruit peeling machine which is useful for removing the peel from citrus fruits such as oranges, lemons and grapefruit. That device is taught as useful when processing citrus fruits for production of fruit juice, an operation which can tolerate damage to the fruit during the peeling operation. Citrus fruits are unlike melons, as they have a layer of pulp which separates the fruit from the peel and facilitates its removal.

There have been devices designed for skinning of meat products as, for example, the devices shown in U.S. Pat. Nos. 2,522,728; 2,912,027 and 3,898,923. In these devices a meat product such as pork jowls is placed on a table and pressed into contact with a rotating feeder roll which has sharp points to penetrate and grip the skin of the meat product and force it over a knife blade which severs the skin from the meat product. While this device is suitable for its intended purpose to de-skin a meat product, it is not suited for removal of rind from fruit in an automated operation as it requires constant manual loading and movement of the meat product against the feed roller. Furthermore, it is necessary that the operator press the meat product against the feed roller, an action which presents a hazard to the operator, as acknowledged in U.S. Pat. No. 3,898,923.

OBJECTIVES OF THE INVENTION

It is an objective of this invention to provide a device for the automated removal of rind from melon sectors.

It is a further object of this invention to provide a device which provides greater fruit flesh recovery than manual removal of rind from melons.

It is a further object of this invention to provide the aforementioned device in a form that can operate without constant operator attention.

Other and related objectives will be apparent from the following description.

BRIEF DESCRIPTION OF THE INVENTION

This invention is a device for removal of rind from melons in which melon rind is flattened as the melon sector is forced through a rind trimming station, resulting in a high recovery of useful product. In its preferred embodiment, the device includes a melon sectoring station with blades which cut melons into sectors, thereby minimizing the manual preparation of the melons. The sectors of melon are fed into the trimming station by toothed wheels which penetrate the rind and pass the melon sectors into contact with a toothed roller which forces the melon sectors into contact with a stationary knife mounted on a flat shoe which flattens the rind as it passes the knife. The flattening of the melon rind and the flesh of the melon sectors permits use of a flat bladed knife while minimizing waste of the melon. Additionally, the trimming device of the invention can trim rind of consistent thickness from melons of varied sizes without adjustment. The trimmed flesh sectors of the melon retain their spherical sector (of ovaloid) sectors shape and the rind which is trimmed from the melon is of uniform thickness.

BRIEF DESCRIPTION OF THE DRAWINGS

The invention will be described with reference to the figures of which:

FIG. 3 is a sectional view along line 3—3' of FIG. 1, illustrating the upper ends of the sector conveying chutes used in the device;

FIG. 4 is a sectional view of the lower ends of the sector conveying chutes used in the device;

FIG. 7 is a perspective view of the knife and flat shoe used at the trimming station of the device;

FIG. 8 illustrates introduction of a melon sector onto the trimming blade of the device;

FIG. 9 illustrates the progression of the melon sector in the trimming station, depicting flattening of the rind;

FIG. 10 illustrates the flattening of the melon rind as the sector reaches near completion of the rind trimming operation;

FIG. 11 illustrates an alternative melon feed mechanism;

FIGS. 12–14 illustrates another alternative melon feed mechanism, with FIG. 12 illustrating a top view of the alternative melon feed mechanism;

FIG. 13 is a side view of the alternative melon feed mechanism; and

FIG. 14 is a view along line 14—14' of FIG. 13.

DESCRIPTION OF PREFERRED EMBODIMENT

Figure 1:
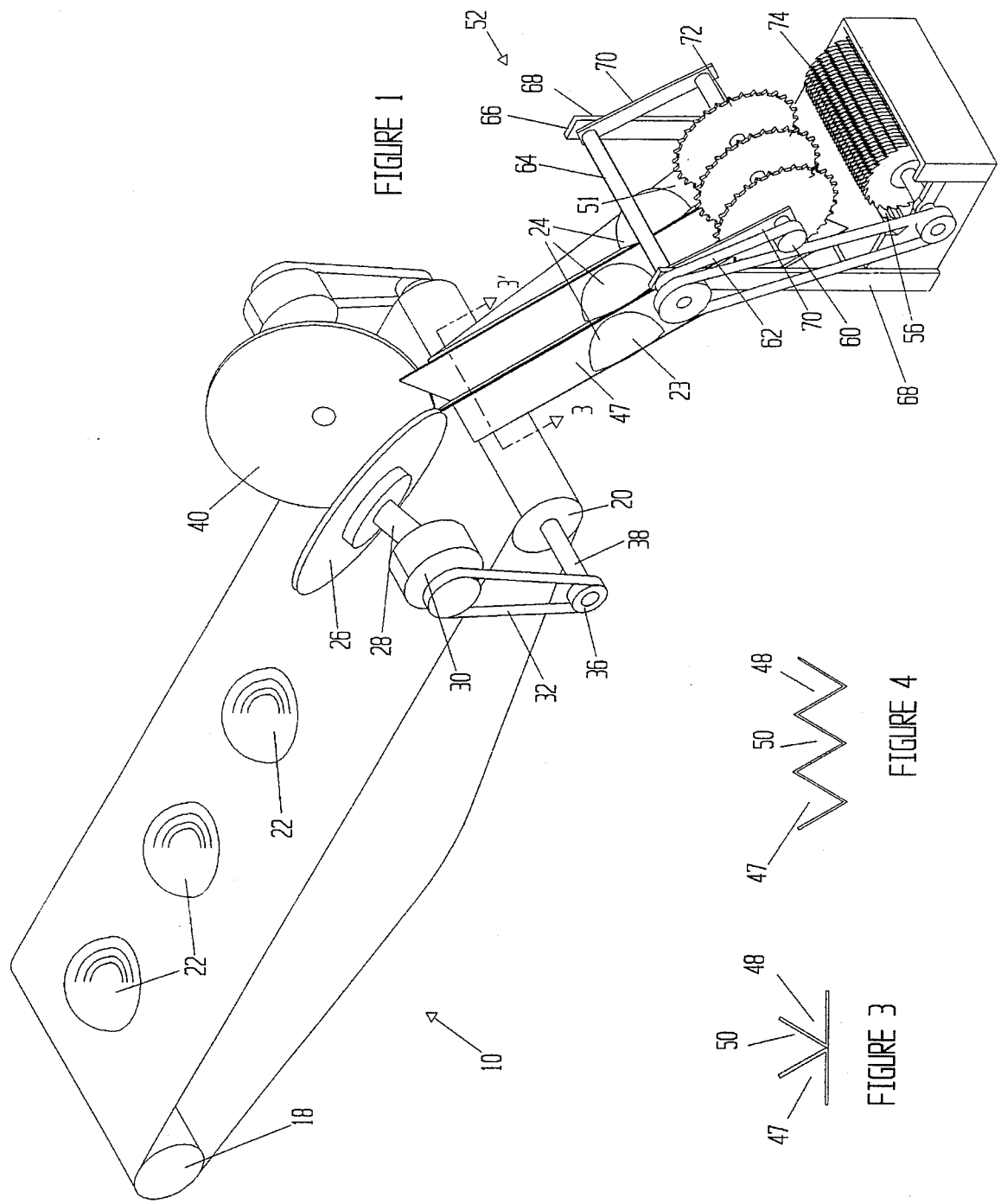
FIG. 1 is a perspective view of the major components of this invention for removal of rind from melons.
Figure 2:
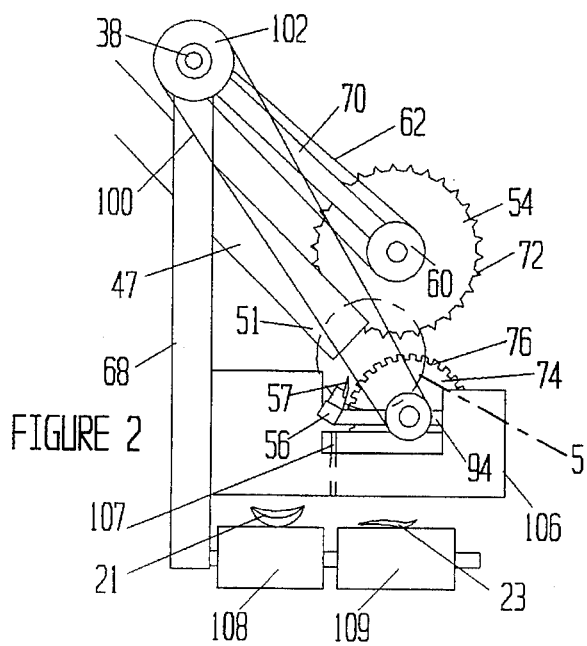
FIG. 2 is an elevational view of the rind trimming station of the device of this invention.

Referring now to FIGS. 1 and 2, the device 10 for removal of rind from melons has a melon sectoring station 12 which is provided with a endless belt conveyor 14 and sectoring, rotating knives 26 and 40. The device also has a rind trimming station 52, which includes rind trimming blades and a feed roller 74. Although the illustrated feed roller is cylindrical, it is understood that substantially any body having a surface of revolution could be employed for this purpose, depending upon the particular geometry of the design. The endless belt conveyor 14 is supported by frame members (not shown), with an endless belt 16 that is passed over rollers 18 and 20 at opposite ends of the conveyor 14. One of the rollers is driven with a suitable power source such as an electric motor and gear box (not shown). Although the supply and positioning of melon halves 22 on the belt 16 can be mechanized, a laborer places melon halves 22, rind up, on the belt 16 in the present embodiment.

The melon halves 22 are moved into the sectoring station 12 by the belt 16 where they are sliced into sectors 24 by circular knives 26 and 40, which are mounted on tilted shafts 28 that are rotationally driven. In the present embodiment, the shafts 28 are mechanically linked with a universal joint and gear box 30 and a chain 32 connects sprocket 34 of the gear box 30 to a drive sprocket 36 on the shaft 38 of the roller 20 of the belt conveyor 14. As illustrated, two circular knives 26 and 40, each mounted at a 60 degree increment, are used to cut melon halves 22 into sectors 24, with each sector 24 constituting one-sixth of a melon.

The melon sectors 24 are discharged into a plurality (three) V-shaped chutes 47, 48 and 50, which are in a side-by-side array and which are oriented at a suitable angle, from 40 to 50 degrees, preferably 45 degrees, to permit the sectors 24, rind side 23 up, to slide down the chutes toward the rind trimming station 52. The lower ends 51 of chutes 47, 48 and 50 are in adjacent juxtaposition to the trimming blades 56 which are located at the rind trimming station 52. The water drains down the feed chutes and lubricates and washes the cutting blade 57, preventing any build up of sugars on the blade. The fruit slides down the feed chutes into engagement with the roller at the rind trimming station 52.

The outer chutes 47 and 50 are twisted on their longitudinal axis as apparent from a comparison of FIGS. 3 and 4. As shown in FIG. 3, the upper ends of chutes 47 and 48 lie on their sides, to receive the cut sectors from the belt conveyor 14. FIG. 4, which is a sectional view of the lower ends of the chutes illustrates that all the chutes are in upright V-trough orientations, in a side-by-side array.

Various configurations can, obviously, be used for the illustrated chutes. The illustration is for a single fruit sector machine. Quite obviously, the feeding chute and cutting stations can be ganged into a plurality of closely spaced stations each of which is provided with a feeding station having the desirable V-shape chute. In such construction, the entire chute can be of a unitary construction with a plurality of the aforementioned V-shaped chutes or grooves.

The chutes 47, 48 and 50 are inclined downwardly at a suitable angle for gravity feeding of the fruit sectors. As illustrated in FIG. 1, the melon sectors 24 are discharged onto the chutes 50 oriented with the flesh of the melons facing downwardly, and with the rind 23 facing upwardly. As apparent from FIGS. 2 and 5, the lower ends 51 of the chutes 47, 48 and 50 are adjacent but not immediately beside the knife 57 of trimming blade 56 and are separated from the knife 57 by a distance which is slightly greater than the thickness of the trimmed melon product. Preferably this distance is adjustable for various fruits, e.g., about 1.25 to about 1.75 inch for cantaloupes and greater distances for melons such as honey dew melons and watermelons.

At the inlet to the rind trimming station 52, each chute 47, 48 and 50 is provided with a toothed feeder wheel 54 which is suspended over the discharge end 51 of each chute 50. The toothed feeder wheels 54 are mounted on a common, driven shaft 58 which has an outboard sprocket 60 that is driven by a chain 62 that extends to a shaft 64 which is rotationally mounted at the upper ends 66 of frame standards 68. The common, driven shaft 58 is mounted on the ends of a pair of swing arms 70 which are pivotally mounted about the centerline of shaft 64, thereby permitting the toothed wheels 54 to raise and lower as they ride over the melon sectors 24. In the present embodiment, the weight of the wheels and support structure is sufficient to obtain engagement of the sectors 24, however, conventional gas filled shock absorbers, or spring biased arms, could also be used for this purpose. Each toothed wheel 54 has a plurality of sharp teeth 72 disposed at equal angular increments on the wheel. The teeth 72 of these wheels penetrate the rind of the melon sectors 24 and force the melon sectors 72 into contact with the toothed roller 74 at the rind trimming station 52. The shaft 64 can be driven by an electric motor, or can be mechanically linked, by a drive chain, to the shaft 38 of the belt conveyor 14.

Figure 5:
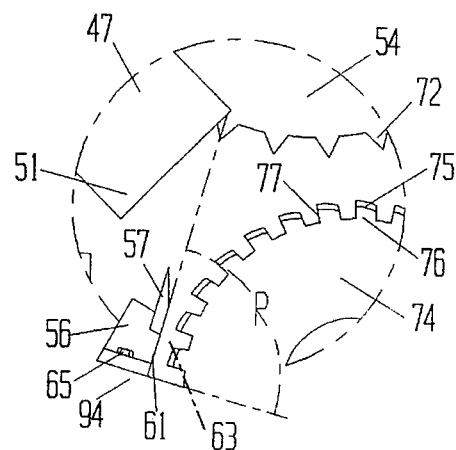
FIG. 5 is an enlarged view of the area within line 5 of FIG. 2.

Referring now to FIGS. 2 and 5, the toothed roller 74 which is used in the invention has a plurality of sharply pointed teeth 76 distributed across its cylindrical external surface. The teeth 76 are preferably oriented in the direction of rotation with a rake angle from about 0 to −5 degrees to penetrate into the external rind of the fruit. Preferably, the outer ends 75 of the teeth are sharpened to insure penetration into the melon rind, and the leading edges 77 of the teeth are flat to force the rind and melon through the trimming station.

The feed roller 74 can be constructed by stacking together a plurality of thin circular star wheels, separated by spacer discs which are plastic washers of lesser outer diameter. Preferably, to maintain sanitary conditions, the feed roller is of unitary construction, and is formed of a single cylinder, with the teeth cast or machined into its outer surface.

In embodiments which have been found entirely suitable for feeding melon sectors, teeth having thicknesses from about 0.065 to about 0.125 inch, preferably about 0.10 inch, are useful with cantaloupes and honey dew melons. The axial distance between the circumferential rows of teeth can be from about 0.2 to about 1.0 inch, preferably about 0.5 inch.

The length of the feed roller depends on the maximum diameter of melons which are to be trimmed. Preferably the feed roller is build with sufficient length to trim melons having diameters up to 10 inches. This requires use of rollers having lengths of at least 16 inches. For even larger melons, such as large watermelons, the roller length can be about 20 inches.

Figure 6:
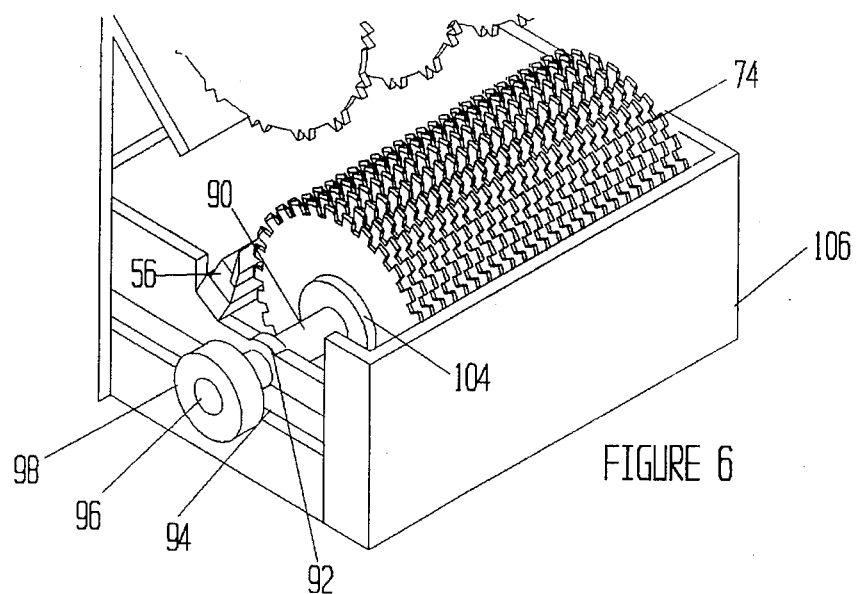
FIG. 6 is an enlarged perspective view of the toothed roller used in the trimming station of the device of this invention.

As shown in FIG. 6, the roller 74 is mounted on a drive shaft 90 that is supported by opposite end journals 92 which are mounted on the side rails 94 of the frame of the device. The journals 92 have conventional lubricated shaft bearings and end 96 of the shaft 90 projects beyond its journal 92 to receive a sprocket 98 which is connected by chain 100 (see FIG. 2) to a drive sprocket 102 on the end of shaft 38. Shaft 38 is driven by an electrical motor which is coupled to the shaft through a right angle gearhead with an output shaft turning at 45 rpm (not shown). The feed roller 74 is retained on the shaft with end collars 104 which are fixedly secured to the shaft by set screws, keys and keyways or other conventional means.

The housing 106 which surrounds the feed roller 74 preferably has an open undersurface for discharge of peeled melon sectors onto a conveyor 108 (see FIG. 2). The housing has a baffle 107 to separate the peeled melon flesh sectors 21 and severed rind 23. The severed rind is discharged onto another conveyor 109 for removal and disposal.

Referring now to FIG. 7, the rind trimming blade 56 is illustrated in perspective view. The blade 56 has a sharp-edged knife 57 that is fastened to a support shoe 59, which has a groove 55 on the roller side of the shoe to receive the blade. As apparent from FIGS. 2 and 3, the knife 57 is mounted immediately adjacent the periphery of the feed roller 74, in the upper quadrant of the roller, and at an angle from about 15 to 40, preferably 30, degrees to the horizontal. For this purpose, the support shoes 59 of the blades 56 are secured to the rails 94 of the device frame. This angular orientation of the trimming knives 57 has been found to facilitate the automatic feeding of the sectors from a gravity feed chute 50 into the rind trimming station 52 with a minimum of incidents of jammed or damaged melon sectors.

As shown in FIG. 5, the knife 57 also can be tilted, by use of shims or the like to provide an angular orientation (angle R) to the support frame from 75° to 105°. Preferably the knife is oriented at 90° for cantaloupe, and at a lesser angle, about 80° for honey dew melons. FIG. 5 also illustrates that the distance between the pressure plate 61 of the blade 56 is inclined to the feed roller 74 so that the distance 63 between the plate 61 and drum of roller 74 decreases in the direction of the rind passage through the trimming station. This compresses the rind and flattens the rind while enhancing its engagement by the reed roller 74. The distance between the knife 57 and the drum of roller 74 also determines the thickness of the rind which is trimmed from the melon. Since this distance can be maintained independently of the size of the melons, different sized melons can be trimmed without adjustment of the machine. Thus melons, such as cantaloupe having sizes of 6, 9, 12, 15, 18 or 23 count (count of melons per box) can be trimmed in the machine without adjustment, and they will all be trimmed to the same consistent thickness of rind which is removed from the melon sectors.

Preferably, the cutting knives 57 are located on adjustable supports whereby the spacing between the cutting knife 57 and roller 74 can be fixedly adjusted by the operator to provide varied thicknesses of the separated rind, depending on the maturity or ripeness of the melons, or to adjust the machine for different melons, such as for watermelons, Persian melons or cantaloupes. For this purpose, the shoe 59 has opposite ends 67 which have an elongate slot 63 which receives a fastener 65 (see FIG. 5) to secure it to the frame support rail 94.

Each of the support shoes 59 of the blades has a flat, planar pressure plate 61 which has sufficient rigidity to cause the rind 23 to flatten as the melon sectors 24 are forced through the rind trimming station 52.

The operation of the rind trimming blades is depicted in FIGS. 8–10. In FIG. 8, a melon sector 24 is shown as it enters the trimming station 52 and is forced onto the inclined cutting edge of the trimming knife 57. In FIG. 9, the melon sector 24 has advanced into the trimming station and the rind 23 is shown as it is separated from the melon flesh 21. The melon sector 24 is also flattened slightly immediately in front of the knife 57, and the flat, planar knife is thus very effective in trimming a thin layer of rind 23 from the melon sector 24 to produce a spherical sector of trimmed melon flesh 21. As shown in FIG. 10, the melon sector 24 has progressed mostly through the trimming station, the flattened rind 23 extends below the trimming blade 57, and the melon flesh sector 21 reverts to its spherical sector shape.

The entire operation of the rind trimming device 10 of the invention is automatic in that no operator intervention is necessary to introduce the fruit sectors into the trimming station as it is not necessary to press or force the melon sectors 24 against the feed roller 74. Furthermore, the feed roller 74 provides all of the force necessary to advance the fruit through the trimming station, severing the rind.

In a typical application of a device having a feed roller of 8 inches outer diameter and a length of 16 inches with a sharp edge knife blade and with the feed chute such as shown in FIG. 2 oriented at approximately 45 degrees to the trimming station, a total of 6000 pounds of sectored cantaloupe which were cut into six equal sectors per melon were trimmed in one hour. The feed roller was operated at 45 rpm. The operation of the cutting device was compared to a conventional operation and it was found that the cutting device of the invention provided approximately 40 to 100 percent increase in yield of product.

Various melon feeding mechanisms can be used rather than the gravity feed chutes shown in FIGS. 1 and 2. A mechanical feeding mechanism 100 is illustrated in FIG. 11, which can be used in combination with chutes such as shown in FIGS. 1 and 2. The mechanism 112 has a continuous chain 102 supported between sprocket wheels 104 and 106. Sprocket wheel 106 is mounted on a driven shaft 108. The chain 102 has a plurality of sharp teeth at spaced apart locations along its length, and the teeth engage the rind 31 of melon sectors 30 and drag the sectors 30 along the chute 24. Although not shown, the feed mechanism 112 could be positioned to introduce the fruit sectors 30 into the device for removal of rind from melons, discharging them onto the teeth 76 of roller 74.

An alternative feeding mechanism 112 is shown in FIGS. 12–14. This mechanism 112 has a pair of conveyors 114 and 116 formed with endless belts which extend about opposite end rollers 118 and 120 which are mounted on supporting frames 122 and 124 at an included angle (see FIG. 14) of about 45 degrees. The frames can be supported on a central angle 126 which also supports bearing journals 128 for the shafts of the end rollers. The frames 122 and 124 are rectangular with top rails 128 and bottom rails 130, and one or more diagonal braces 132 and 134. At their upper edges, each of the frames has end brackets 136 which support bearing journals for the upper ends of the roller shafts. Each of the belt conveyors has a drive motor 138 linked, through a suitable gear train 140, to the shaft of the belt roller, so melons can be moved along the conveyors 114 and 116 in the desired attitude, with the rind side up. A commercial version of such a conveyor is available under the designation Vee belt feeder.

The forced feed mechanisms of FIGS. 11–14 provide forced feed of the melon sectors, and can be used horizontally, or inclined, as necessary to move the melon sectors from the washing location into the device for removal of rind from melons. Their use also permits mounting of the device for removal of rind from melons horizontally, rather than on the 45 degree downward inclination shown in FIG. 2.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A device for removal of rind from melons which comprises:
   a. a cutting station having:
      (1) a cutting member having an upwardly facing cutting edge which is supported on a shoe having a flat planar pressure plate with sufficient rigidity to resist flexing under the applied pressure of said rind;
      (2) a rotary feeder having a body with an external surface of revolution with a plurality of teeth distributed about said external surface and rotational mounted in said peeler at said cutting station adjacent to and spaced apart from said cutting member by a distance sufficient to permit passage of separated rind therebetween; and
      (3) drive means to rotate said feeder; and
   b. means to introduce melon sectors to said cutting station for engagement with said rotary feeder which comprises a first conveyor to deliver melon sectors to said cutting station with the rind surfaces of said sectors exposed and including a moving member with external teeth located above the first conveyor, said cutting member and said rotary feeder with the teeth of said moving member positioned to engage the rind surfaces of said melon sectors on said conveyor and transfer said melon sectors to said rotary feeder.

2. The device for removal of rind from melons of claim 1 wherein said cutting member is a knife with a sharp-edged blade.

3. The device for removal of rind from melons of claim 2 wherein said first conveyor comprises a feed chute with an upwardly facing, V-shaped chute to receive said sectors of melon and supported with its lower end in adjacent juxtaposition to said cutting member, oriented towards said external surface of said rotary feeder, and separated from said cutting member by a clearance sufficient to permit passage of derinded melon therebetween.

4. The device for removal of rind from melons of claim 2 wherein said rotary feeder is a cylindrical member.

5. The device for removal of rind from melons of claim 2 wherein said device for removal of rind from melons includes a support frame, and including knife support means comprising knife support brackets fixedly secured to the support frame of said device.

6. The device for removal of rind from melons of claim 5 wherein said knife support brackets are adjustably mounted on said support frame to provide variation in spacing of said knife from said rotary feeder and thereby provide for varied thickness of rind removed from said melon sectors.

7. The device for removal of rind from melons of claim 5 wherein the distance between said knife and said feed roller is fixedly adjustable to provide variation in spacing of said knife from said rotary feeder and thereby provide for varied thickness of rind removed from said melon sectors.

8. The device for removal of rind from melons of claim 1 wherein said feeder member comprises a toothed wheel rotatably supported above said conveyor on a pivotal arm whereby said toothed wheel rides on the exposed rind surfaces of said melon sectors.

9. The device for removal of rind from melons of claim 8 including drive means to rotate said wheel.

10. The device for removal of rind from melons of claim 1 including a melon sectoring station having at least one cutting member to subdivide melon halves into sectors and including a sectoring station conveyor to deliver melon halves to said cutting member and transfer melon sectors from said cutting member to said first conveyor.

11. The device for removal of rind from melons of claim 10 wherein said first conveyor comprises a feed chute with an upwardly facing, V-shaped chute to receive said sectors of melon and supported with its lower end in adjacent juxtaposition to said cutting member, oriented towards said external surface of said rotary feeder, and separated from said cutting member by a clearance sufficient to permit passage of derinded melon therebetween.

12. The device for removal of rind from melons of claim 11 wherein said cutting member comprises a pair of circular knifes rotatably mounted on tilted shafts inclined at about 60 degrees to said sectoring station conveyor to subdivide melon halves thereon into three substantially equal-sized sectors.

13. The device for removal of rind from melons of claim 12 wherein said first conveyor comprises three V-shaped chutes in a side-by-side array.

14. The device for removal of rind from melons of claim 12 wherein said sectoring station conveyor is an endless belt.

15. An automated melon derinding machine having a melon sectoring station and a melon sector derinding station which comprises:
   a. a melon sectoring station having at least one cutting member to subdivide melon halves into sectors and including a sectoring station conveyor to deliver melon halves to said cutting member and transfer melon sectors from said cutting member;
   b. a derinding station having a rind cutting member with an upwardly facing cutting edge and sufficient rigidity to resist flexing under the applied pressure of rind severed from said melon sectors and a feeder with a plurality of teeth mounted for movement past said cutting member and mounted in said derinding machine at said cutting station adjacent to and spaced apart from said rind cutting member by a distance sufficient to permit passage of separated rind therebetween; and drive means to move said feeder; and
   c. a derinding station conveyor to receive melon sectors from said sectoring station and to deliver melon sectors to said derinding station with the rind surfaces of said sectors exposed and including a moving member with external teeth located above the first conveyor, said rind cutting member and said feeder with the teeth of said moving member positioned to engage the rind surfaces of said melon sectors on said conveyor and transfer said melon sectors to said rotary feeder.

16. The melon derinding machine of claim 15 wherein said rind cutting member comprises a pair of circular knifes rotatably mounted on tilted shafts inclined at about 60 degrees to said sectoring station conveyor to subdivide melon halves thereon into three substantially equal-sized sectors.

17. The melon derinding machine of claim 15 wherein said derinding station conveyor comprises a feed chute with an upwardly facing, V-shaped chute to receive said sectors of melon and supported with its lower end in adjacent juxtaposition to said rind cutting member, oriented towards said external surface of said feeder, and separated from said cutting member by a clearance sufficient to permit passage of derinded melon therebetween.

18. The melon derinding machine of claim 17 wherein said derinding station conveyor comprises three V-shaped chutes in a side-by-side array.

19. The melon derinding machine of claim 15 wherein said sectoring station conveyor is an endless belt.

* * * * *